US012603425B2

(12) United States Patent
Wang et al.

(10) Patent No.: US 12,603,425 B2
(45) Date of Patent: Apr. 14, 2026

(54) COUPLER AND RELATED METHOD, MODULE AND DEVICE

(71) Applicant: NOKIA SOLUTIONS AND NETWORKS OY, Espoo (FI)

(72) Inventors: Yuanhao Wang, Hangzhou (CN); Hao Wang, Hangzhou (CN); Li Miao, Hangzhou (CN); Cheng Li, Hangzhou (CN); Feng Zhou, Hangzhou (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/698,135

(22) PCT Filed: Oct. 25, 2021

(86) PCT No.: PCT/CN2021/126143
§ 371 (c)(1),
(2) Date: Apr. 3, 2024

(87) PCT Pub. No.: WO2023/070271
PCT Pub. Date: May 4, 2023

(65) Prior Publication Data
US 2024/0405418 A1 Dec. 5, 2024

(51) Int. Cl.
*H01P 5/12* (2006.01)
*H01P 5/02* (2006.01)
(Continued)

(52) U.S. Cl.
CPC ................. *H01Q 1/50* (2013.01); *H01P 5/02* (2013.01); *H01Q 21/0006* (2013.01)

(58) Field of Classification Search
CPC ......... H01P 5/02; H01P 5/12–18; H01Q 1/38; H01Q 1/48–50; H01Q 9/0414; H01Q 21/00
See application file for complete search history.

(56) References Cited

U.S. PATENT DOCUMENTS 6,069,587 A * 5/2000 Lynch .................. H01Q 9/0407 343/702
9,692,125 B1 * 6/2017 Channabasappa ..... H01Q 5/385
(Continued)

FOREIGN PATENT DOCUMENTS

CN 103187603 A 7/2013
CN 105591183 A 5/2016
(Continued)

OTHER PUBLICATIONS

International Search Report and Written Opinion dated Jun. 22, 2022 corresponding to International Patent Application No. PCT/CN2021/126143.
(Continued)

*Primary Examiner* — Hasan Islam
(74) *Attorney, Agent, or Firm* — SQUIRE PATTON BOGGS (US) LLP

(57) ABSTRACT

Embodiments of the present disclosure relate to a coupler, antenna module and electronic device. The coupler comprises a first substrate layer and a second substrate layer located below the first substrate layer. The coupler also comprises a first coupling line located on an upper surface of the first substrate layer and a second coupling line located on a lower surface of the second substrate layer. The coupler further comprises a first ground layer located between a lower surface of the first substrate layer and an upper surface of the second substrate layer, a plurality of hole groups being formed in the first ground layer and being geometrically designed such that an electromagnetic field of the first coupling line is coupled to the second coupling line through the plurality of hole groups. In this way, PCB space and size may be saved, RF performance may be improved, and PCB cost may be reduced.

21 Claims, 12 Drawing Sheets

(51) Int. Cl.
*H01Q 1/50* (2006.01)
*H01Q 21/00* (2006.01)

(56) References Cited

U.S. PATENT DOCUMENTS

| | | | | |
|---|---|---|---|---|
| 10,020,594 | B2 * | 7/2018 | Kim | H01Q 21/0037 |
| 11,456,534 | B2 * | 9/2022 | Mitchell | H01Q 5/378 |
| 12,021,307 | B2 * | 6/2024 | Kim | H01Q 1/246 |

FOREIGN PATENT DOCUMENTS

| | | | |
|---|---|---|---|
| CN | 113049883 | A | 6/2021 |
| JP | 2007-243123 | A | 9/2007 |
| WO | 2021139205 | A1 | 7/2021 |

OTHER PUBLICATIONS

The extended European Search Report dated Jun. 17, 2025, in corresponding European Patent Application No. 21961657.0.
K. Rambabu et al., "Design of a Miniaturized Stripline-to-Microstrip-Line Coupler," 2002 IEEE MTT-S International Microwave Sumposium Digest, Jun. 2, 2002, XP001099453.
Tomas Shejbal, "Directivity Coupler with a Very Low Coupling Coefficient," 13th Conference on Microwave Techniques COMITE 2013, Apr. 17, 2013, XP032429947.
Indian Office Action corresponding to IN Application No. 202447036739, dated Feb. 19, 2026.

* cited by examiner

COUPLER AND RELATED METHOD, MODULE AND DEVICE

FIELD

Embodiments of the present disclosure generally relate to the field of telecommunication and in particular, to a coupler, an antenna module, an electronic device and a method for fabricating the coupler.

BACKGROUND

A coupler is a core element of a calibration network for a multi-input multi-output (MIMO) antenna array. A conventional coupler consists of two coupling lines which are closed located in a plane. When a radio frequency (RF) signal is transmitted on one of the two coupling lines, an electro-magnetic field is coupled to the other of the two coupling lines, resulting in coupling and isolation characteristics.

Although the conventional coupler is used widely in an antenna calibration network, some problems exist all the time such as a waste of printed circuit board (PCB) space due to a planar structure, deterioration of a RF performance due to a via design, fixed output characteristics, and so on. Thus, an improved coupler needs to be designed to overcome at least part of such problems.

SUMMARY

In general, example embodiments of the present disclosure provide a coupler, an antenna module, an electronic device and a method for fabricating a coupler.

In a first aspect, there is provided a coupler. The coupler comprises: a first substrate layer; a second substrate layer located below the first substrate layer; a first coupling line located on an upper surface of the first substrate layer; a second coupling line located on a lower surface of the second substrate layer; and a first ground layer located between a lower surface of the first substrate layer and an upper surface of the second substrate layer, a plurality of hole groups being formed in the first ground layer and being geometrically designed such that an electro-magnetic field of the first coupling line is coupled to the second coupling line through the plurality of hole groups.

In a second aspect, there is provided an antenna module. The antenna module comprises a plurality of couplers according to the first aspect.

In a third aspect, there is provided an electronic device. The electronic device comprises an antenna module according to the second aspect.

In a fourth aspect, there is also provided an electronic device. The electronic device comprises a coupler according to the first aspect.

In a fifth aspect, there is provided a method for fabricating a coupler. The method comprises: forming a first coupling line on an upper surface of a first substrate layer; forming a second coupling line on a lower surface of a second substrate layer, the second substrate layer being located below the first substrate layer such that an upper surface of the second substrate layer faces a lower surface of the first substrate layer; and forming a first ground layer such that the first ground layer is located between the lower surface of the first substrate layer and the upper surface of the second substrate layer, and such that a plurality of hole groups are formed in the first ground layer and are geometrically designed such that an electro-magnetic field of the first coupling line is coupled to the second coupling line through the plurality of hole groups.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
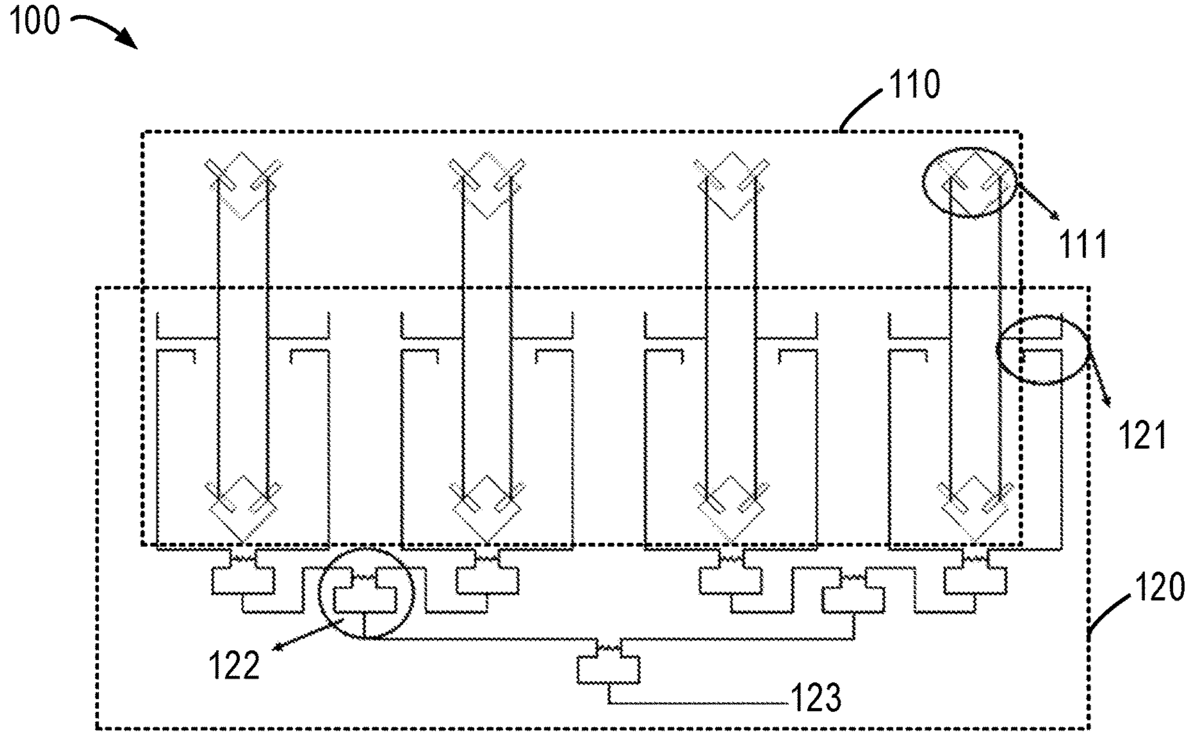
FIG. 1 illustrates a diagram of an example MIMO antenna module in which embodiments of the present disclosure may be implemented.

Principle of the present disclosure will now be described with reference to some example embodiments. It is to be understood that these embodiments are described only for the purpose of illustration and to help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile device or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. In addition, the term "communication network" may also refer to non-cellular communications network. The communications may include direct device to device communication, e.g. (a) base station node to base station node, or (b) mobile device to mobile device, without any interaction of a mobile device (in case a) or a base station (in case b). Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "communication device" or "electronic device" refers to a network device or a terminal device in a communication network. The term "network device" refers to a node in the communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. An RAN split architecture comprises a gNB-CU (Centralized unit, hosting RRC, SDAP and PDCP) controlling a plurality of gNB-DUs (Distributed unit, hosting RLC, MAC and PHY).

The term "terminal device" refers to any end device that may be capable of wireless communication. By way of example rather than limitation, a terminal device may also be referred to as a communication device, user equipment (UE), a mobile device, a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Although functionalities described herein can be performed, in various example embodiments, in a fixed and/or a wireless network node may, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

The term "mobile device" refers to a device capable of being moved from point A to point B by any means, for example and not limited to: by hand, by carrying, by vehicle (driving, flying, sailing/floating in a liquid, etc), by being worn by a user of the mobile device.

In addition, the term "communication device" or "electronic device" may also refer to fixed or stationary electronic communication devices, e.g. base station nodes, which are devices which are fixed in place and do not move.

Due to better beam forming, beam pointing and hot spot coverage performance, a large-scale active antenna array or massive MIMO antenna array will replace a conventional passive antenna array to become a basic form of 5G cellular mobile communication base station system. A calibration network may be detected and backward corrected the phase and amplitude of signals being transmitted or received from the antenna array, and then beam-forming performance of the active antenna array may be controlled. Thus, a calibration network becomes a key device in the active antenna array, and a coupler is a core element of such calibration network.

As mentioned above, some problems in a conventional coupler exist all the time such as a waste of PCB space due to a planar structure, deterioration of a RF performance due to a via design, fixed output characteristics, and so on.

In order to at least in part solve above and other potential problems, example embodiments of the present disclosure provide an improved coupler. The improved coupler comprises two coupling lines. The two coupling lines are located on top of each other and a stack is sandwiched between the two coupling lines. The stack comprises two substrate layers and a ground layer between the two substrate layers. The ground layer is formed with a plurality of hole groups and the plurality of hole groups are partially overlapped with the two coupling lines. In this way, a coupler is achieved in a vertical space by forming two coupling lines at different layers without using a metal via. Thus, PCB space and size may be saved, RF performance may be improved, and PCB cost may be reduced.

It is to be understood that a coupler according to embodiments of the present disclosure may be applied to a directional coupler or a partially directional coupler or any other suitable types of couplers.

Principle and implementations of the present disclosure will be described in detail below with reference to FIGS. 1 to 13.

Example of Application Environment

FIG. 1 illustrates a diagram of an example MIMO antenna module 100 in which embodiments of the present disclosure may be implemented. As shown in FIG. 1, the antenna module 100 may comprise an antenna array 110, a calibration network 120 for the antenna array 110 and a feeding network for the antenna array (not shown). The antenna array 110 may comprise a plurality of antenna elements (AEs) 111. The calibration network 120 may comprise a plurality of couplers 121. Each coupler 121 is configured for each AE 111 or sub-array and causes a part of signals transmitted to or received from the AEs 111 to be transmitted to the calibration network 120. In other words, the plurality of couplers 121 may collect calibration signals for the calibration network 120. The calibration network 120 may comprise a plurality of power dividers 122 such as Wilkinson power dividers. The plurality of power dividers 122 may be configured to combine all those separated signals together to a calibration port 123.

It should be noted that the number of the antenna array, AEs, couplers, power dividers and calibration network in FIG. 1 is given for the purpose of illustration without suggesting any limitations to the present disclosure. The antenna module 100 may include any suitable number of the antenna array, AEs, couplers, power dividers and calibration network adapted for implementing implementations of the present disclosure. Further, the antenna module 100 may comprise additional components not shown and/or may omit some components as shown, and the scope of the present disclosure is not limited in this regard. It should also be noted that embodiments of the present disclosure may also be applied to any other suitable high-frequency applications, and are not limited to the above antenna application.

Outline of Conventional Solution

Figure 2:
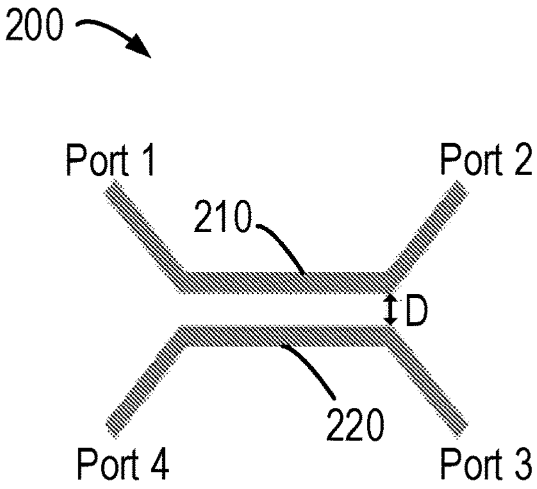
FIG. 2 illustrates a diagram of an operating principle of a coupler according to a conventional solution.

FIG. 2 illustrates a diagram 200 of an operating principle of a coupler according to a conventional solution. As shown in FIG. 2, the coupler comprises two coupling lines 210 and 220. The two coupling lines 210 and 220 are closely located with a distance D. When a RF signal is transmitted on one of the coupling lines (for example, from Port 1 to Port 2 of the coupling line 210), an electro-magnetic field is coupled to another one (for example, the coupling line 220), resulting in coupling and isolation characteristics.

For example, Port 1 of the coupling line 210 may be coupled to an antenna array via a feeding network for the antenna array, and Port 2 of the coupling line 210 may be coupled to a transceiver processing module. Assuming that Port 3 of the coupling line 220 is a coupling port and Port 4 of the coupling line 220 is an isolation port. Port 3 may be coupled to a calibration network for the antenna array. Port 3 may collect signals transmitted from Port 1 to Port 2 and transmit the collected signals to the calibration network for antenna calibration. Port 4 of the coupling line 220 may be coupled to an impedance element.

The distance D between the two coupling lines 210 and 220 determines a magnitude of coupling of the coupler, and a length of parallel portions of the two coupling lines 210 and 220 determines an operating frequency of the coupler. By changing shapes of the two coupling lines, good isolation and return loss performance may be obtained.

Figure 3:
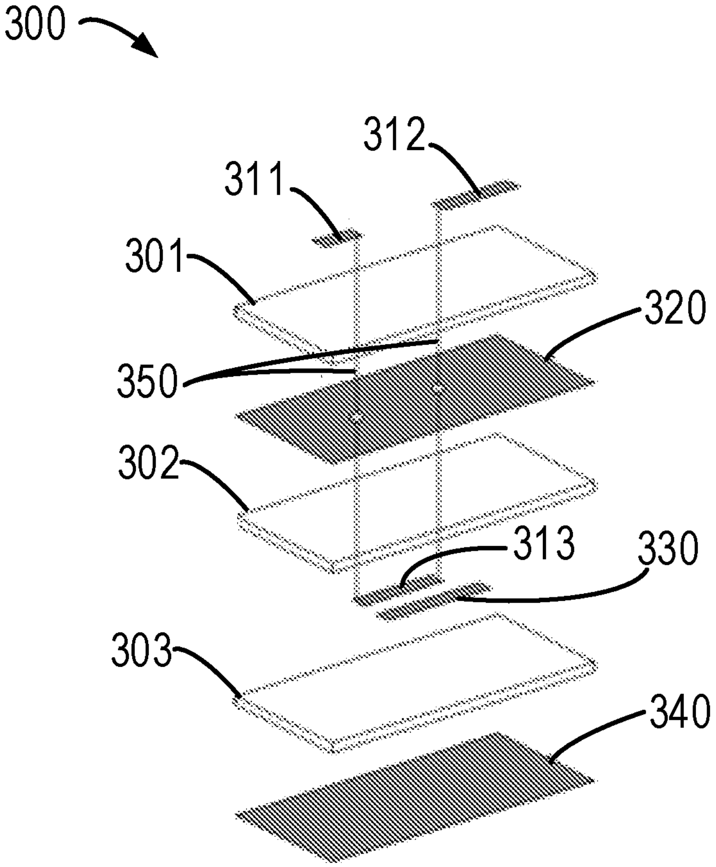
FIG. 3 illustrates a diagram of a structure of a coupler according to a conventional solution.

FIG. 3 illustrates a diagram 300 of a structure of a coupler according to a conventional solution. As shown in FIG. 3, one coupling line (an antenna feeding line) are broken into three parts 311, 312 and 313. The parts 311 and 312 are located on the top side of a dielectric substrate 301 and the part 313 is located on the bottom side of a dielectric substrate 302 or on the tope side of a dielectric substrate 303. Another coupling line 330 is located in the same plane as the part 313. Each of the parts 311 and 312 is connected to the part 313 by a metal via 350 so as to be coupled with the coupling line 330. A ground plane 320 is located between dielectric substrates 301 and 302 and used to isolate the two coupling lines. Besides, a dielectric substrate 303 and a ground layer 340 on the bottom side of the dielectric substrate 303 are used to protect the coupler to get better RF performance.

It can be seen that, the conventional coupler is a planar structure, and lots of planar size will be used. Thus, a PCB space is wasted. Further, one of the coupling lines (for example, the parts 311, 312 and 313) is a part of an antenna feeding line. As the antenna feeding line usually uses a good PCB material to get a better antenna performance, PCB cost is increased. Furthermore, when the antenna feeding line goes to a different layer to couple with another coupling line, vias are used. However, the vias may deteriorate the RF performance. Moreover, output characteristics of the conventional coupler are fixed. In other words, once a type of the coupler is selected, no matter how to design, the coupling port, isolation port and output phase are fixed and cannot be changed. In addition, the two coupling lines in the conventional coupler should have an equal length, and must be nearly to a λ/4, where λ denotes a wavelength at a center frequency of an operating bandwidth of the coupler. Thus, such design is not flexible.

Example Implementation of Improved Coupler

In view of this, embodiments of the present disclosure provide an improved coupler. The details will be described below with reference to FIGS. 4 to 12C.

1. Basic Structure

Figure 4:
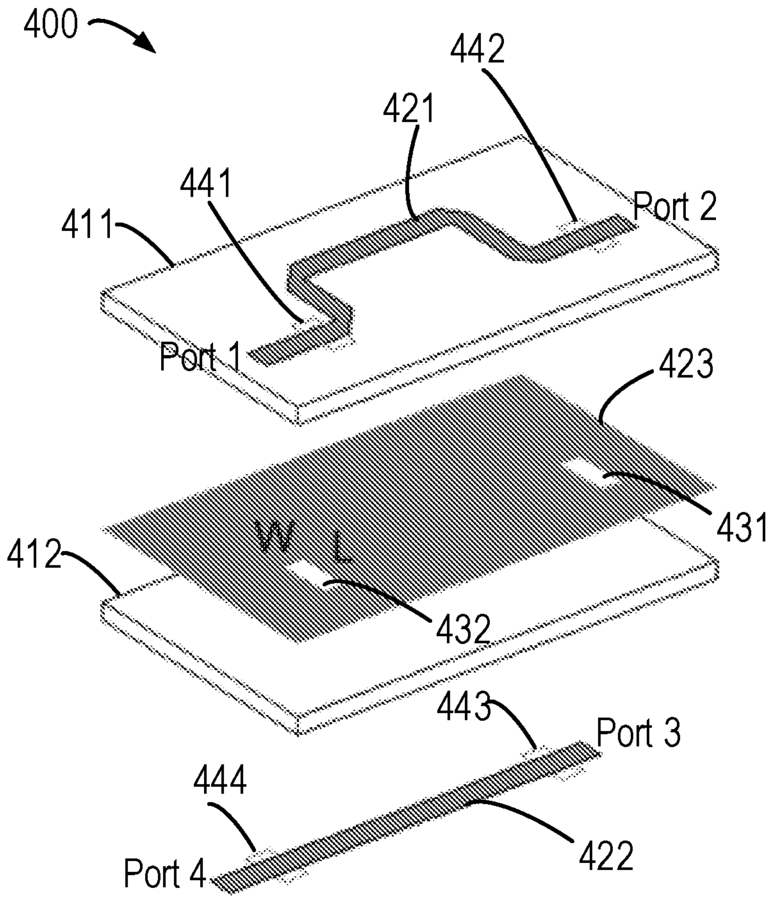
FIG. 4 illustrates a diagram of an example structure of a coupler according to some example embodiments of the present disclosure.

FIG. 4 illustrates a diagram of an example structure of a coupler 400 according to some example embodiments of the present disclosure. As shown in FIG. 4, the coupler 400 comprises a substrate layer 411 (for convenience, also referred to as a first substrate layer herein) and a substrate layer 412 (for convenience, also referred to as a second substrate layer herein) located below the substrate layer 411. The coupler 400 also comprises a coupling line 421 (for convenience, also referred to as a first coupling line herein) located on an upper surface of the substrate layer 411 and a coupling line 422 (for convenience, also referred to as a second coupling line herein) located on a lower surface of the substrate layer 412.

Further, the coupler 400 comprises a ground layer 423 (for convenience, also referred to as a first ground layer herein) located between a lower surface of the substrate layer 411 and an upper surface of the substrate layer 412. A plurality of hole groups (for illustration, two hole groups 431 and 432 are shown here) are formed in the ground layer 423 and are geometrically designed such that an electro-magnetic field of the coupling line 421 is coupled to the coupling line 422 through the plurality of hole groups.

In some embodiments, the hole structures 431 and 432 may be located at overlapped portions of the coupling lines 421 and 422. That is, as shown in FIG. 4, projections 441 and 442 of the hole groups 431 and 432 on a plane in which the coupling line 421 is located are partially overlapped with the coupling line 421, and projections 443 and 444 of the hole groups 431 and 432 on a plane in which the coupling line 422 is located will be partially overlapped with the coupling line 422. It is to be understood that the projections 441, 442, 443 and 444 are shown merely for illustration, and are not actually present elements.

In some embodiments, the plurality of hole groups may be arranged nonlinearly. Of course, the plurality of hole groups may be arranged linearly. The present disclosure does not limit this aspect. In some embodiments, the plurality of hole groups may comprise two groups of holes, and each group may comprise one or more holes. The one or more holes may be arranged in any suitable forms and may adopt any suitable shapes. The present disclosure also does not limit this aspect.

In some embodiments, each of the substrate layers 411 and 412 may be a multi-layer stack. In some embodiments, the substrate layers 411 and 412 may have different thicknesses. In some embodiments, the substrate layers 411 and 412 may have different relative dielectric constants.

In some embodiments, the coupler 400 may be implemented by one PCB. In other words, the substrate layers 411 and 412, the coupling lines 421 and 422 and the ground layer 423 may be formed in the same PCB, for example, in a multi-layer PCB.

Figure 5:
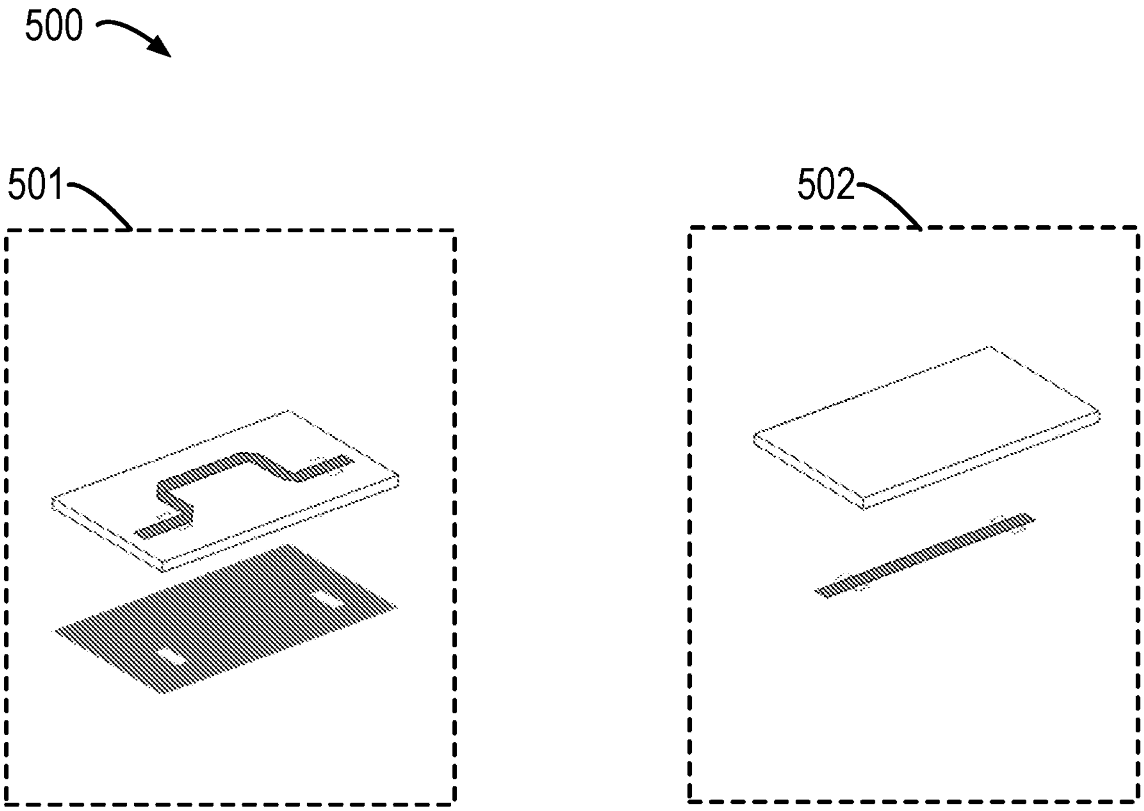
FIG. 5 illustrates a diagram of an example of a two-PCB structure of a coupler according to some example embodiments of the present disclosure.

In some alternative embodiments, the coupler 400 may be implemented by two PCBs. For clarity, the detailed description will be given with reference to FIG. 5. FIG. 5 illustrates a diagram of an example of a two-PCB structure of a coupler 500 according to some example embodiments of the present disclosure. For convenience, FIG. 5 will be described in connection with the example of FIG. 4.

As shown in FIG. 5, the coupler 500 comprises two PCBs 501 and 502. In this example, the PCB 501 may comprise the substrate layer 411, the coupling line 421 and the ground layer 423 in FIG. 4. In some embodiments, the ground layer 423 may be formed on the lower surface of the substrate layer 411. The PCB 502 may comprise the substrate layer 412 and the coupling line 422 in FIG. 4.

In a modified example (not shown) for FIG. 5, the ground layer 423 may be formed in PCB 502 instead of PCB 501. In this case, the ground layer 423 may be formed on the upper surface of the substrate layer 412.

With the two-PCB structure, the substrate layers 411 and 412 may be formed in different PCBs and may be fabricated by different materials so as to reduce the PCB cost. For example, in an antenna application, the PCB 501 may be fabricated by a low-loss and expensive material to ensure good RF performance, and the PCB 502 may be fabricated by a cheaper material. Thus, the PCB cost is reduced significantly.

2. Modified Structure

Figure 6A:
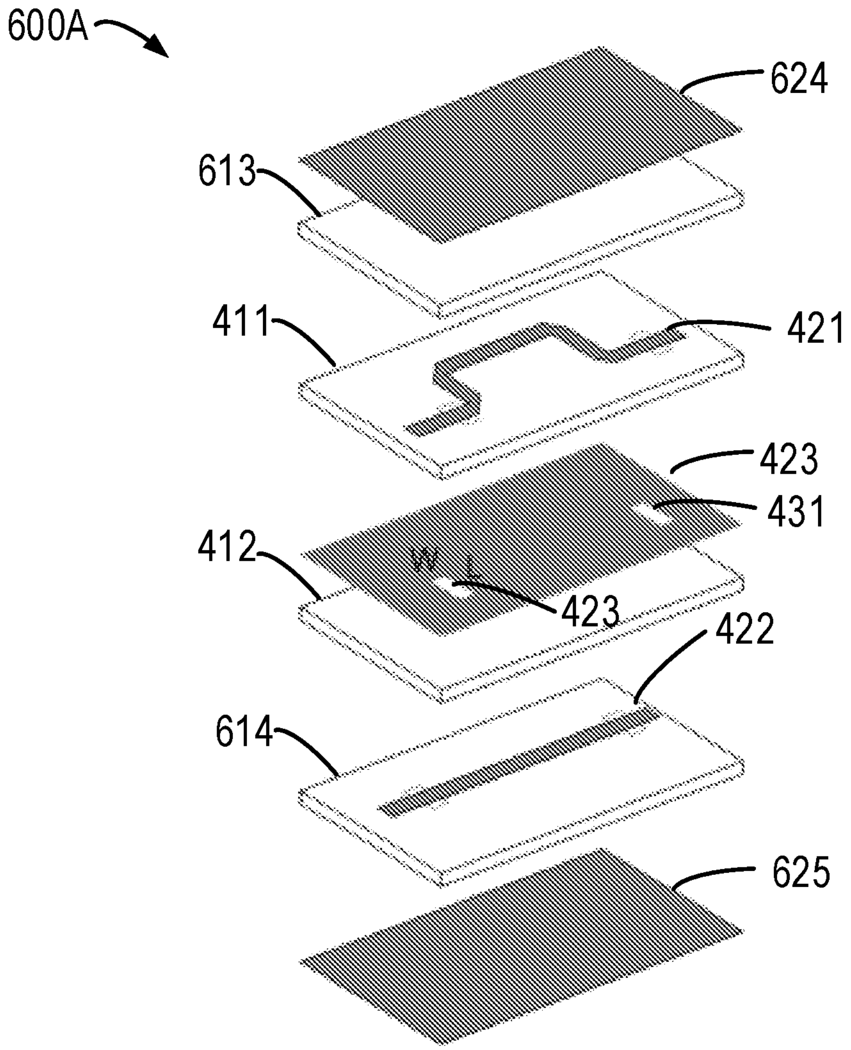
FIG. 6A illustrates a diagram of another example structure of a coupler according to some example embodiments of the present disclosure.

FIG. 6A illustrates a diagram of another example structure of a coupler 600A according to some example embodiments of the present disclosure. For convenience, FIG. 6A will be described in connection with the example of FIG. 4.

As shown in FIG. 6A, in addition to the substrate layers 411 and 412, the coupling lines 421 and 422 and the ground layer 423, the coupler 600A comprises a substrate layer 613 (also referred to as a third substrate layer herein) located on the substrate layer 411 and a ground layer 624 (also referred to as a second ground layer herein) located on the substrate layer 613. In this way, the coupling line 421 may be well isolated.

As shown in FIG. 6A, the coupler 600A also comprises a substrate layer 614 (also referred to as a fourth substrate layer herein) located below the substrate layer 412 and a ground layer 625 (also referred to as a third ground layer herein) located below the substrate layer 614. In this way, the coupling line 422 may also be well isolated.

In some embodiments, each of the substrate layers 613 and 614 may be a multi-layer stack. In some embodiments, the substrate layers 411, 412, 613 and 614 may have different thicknesses. In some embodiments, the substrate layers 411, 412, 613 and 614 may have different relative dielectric constants.

In a modified example (not shown) for FIG. 6A, in addition to the substrate layers 411 and 412, the coupling lines 421 and 422 and the ground layer 423, the coupler 600A may only comprise the substrate layer 613 and the ground layer 624. In another modified example (not shown) for FIG. 6A, in addition to the substrate layers 411 and 412, the coupling lines 421 and 422 and the ground layer 423, the coupler 600A may also only comprise the substrate layer 614 and the ground layer 625.

Figure 6B:
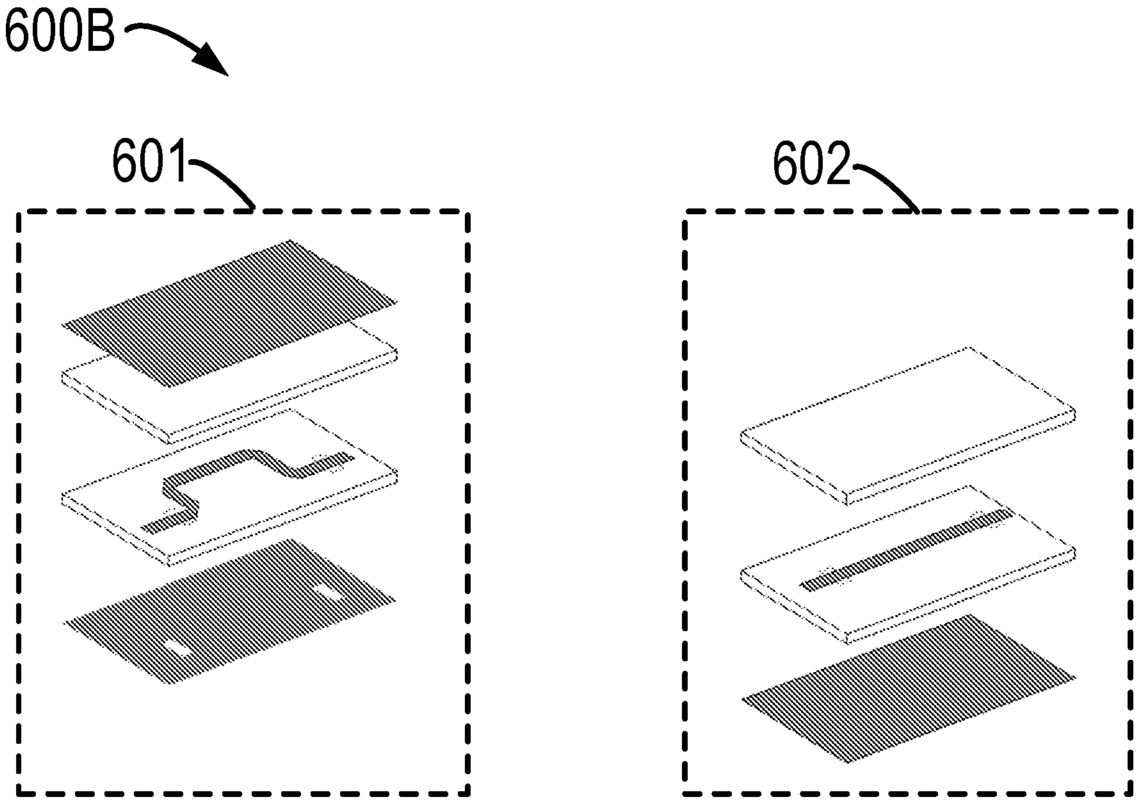
FIG. 6B illustrates a diagram of another example of a two-PCB structure of a coupler according to some example embodiments of the present disclosure.

In some embodiments, the coupler 600A may be implemented by one PCB. In some alternative embodiments, the coupler 600A may be implemented by two PCBs. For clarity, the detailed description will be given with reference to FIG. 6B. FIG. 6B illustrates a diagram of another example of a two-PCB structure of a coupler 600B according to some example embodiments of the present disclosure. For convenience, FIG. 6B will be described in connection with the example of FIG. 6A.

As shown in FIG. 6B, the coupler 600B comprises two PCBs 601 and 602. In this example, the PCB 601 may comprise the substrate layer 613, the ground layer 624, the substrate layer 411, the coupling line 421 and the ground layer 423 in FIG. 6A. The PCB 602 may comprise the substrate layer 412, the coupling line 422, the substrate layer 614 and the ground layer 625 in FIG. 6A.

In a modified example (not shown) for FIG. 6B, the ground layer 423 may be formed in PCB 602 instead of PCB 601. In a modified example (not shown) for FIG. 6B, the PCB 601 may only comprise the substrate layer 411, the coupling line 421 and the ground layer 423 and not comprise the substrate layer 613 and the ground layer 624 in FIG. 6A. In another modified example (not shown) for FIG. 6B, the PCB 602 may only comprise the substrate layer 412 and the coupling line 422 and not comprise the substrate layer 614 and the ground layer 625.

Figure 7:
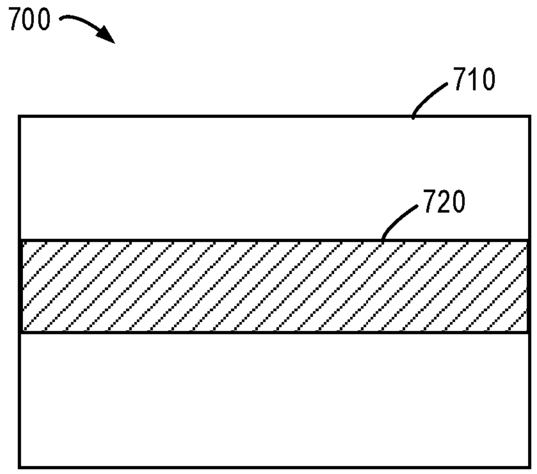
FIG. 7 illustrates a diagram of comparison between two PCBs of a coupler according to some example embodiments of the present disclosure.

For the two-PCB structure, the two PCBs may be fabricated in different sizes. FIG. 7 illustrates a diagram 700 of comparison between two PCBs of a coupler according to some example embodiments of the present disclosure. For convenience, FIG. 7 will be described in connection with the example of FIGS. 5 and 6B.

As shown in FIG. 7, PCB 710 has a larger size and PCB 720 has a smaller size. For example, the PCB 710 may implement the PCB 501 in FIG. 5, and the PCB 720 may implement the PCB 502 in FIG. 5. As another example, the PCB 710 may implement the PCB 601 in FIG. 6B, and the PCB 720 may implement the PCB 602 in FIG. 6B. As two PCBs may be fabricated in different sizes, PCB area is saved.

3. Example Analysis of Output Characteristics

With reference to FIG. 4, assuming that a total length of the coupling line 421 is L1 between the two hole groups 431 and 432, and a phase corresponding to an operating frequency is θ1, where the unit of θ1 is degree. Also, assuming that a total length of the coupling line 422 is L2 between the two hole groups 431 and 432, and a phase corresponding to an operating frequency is θ2, where the unit of θ2 is degree.

Assuming that a RF signal is transmitted from Port 1 to Port 2 of the coupling line 421. In this case, output characteristics of Port 4 and Port 3 of the coupling line 422 may be represented in equations (1) and (2).

$$\text{Port } 4 = Ae^{-j0} + Ae^{-j\theta 1 - j\theta 2} = A + A*\cos(\theta 1 + \theta 2) + j*A*\sin(\theta 1 + \theta 2) \quad (1)$$

$$\text{Port } 3 = Ae^{-j\theta 2} + Ae^{-j\theta 1} \quad (2)$$

where θ1 denotes an output phase of the coupling line 421 (Port 2) corresponding to an operating frequency, θ2 denotes an output phase of the coupling line 422 (Port 3) corresponding to an operating frequency, A denotes a coupling amplitude, and j denotes mathematic symbol of complex number.

It can be seen from equations (1) and (2) that outputs of Port 3 and Port 4 of the coupling line 422 may be different based on different lengths of the coupling lines 421 and 422.

If Port 4 of the coupling line 422 is an isolation port, equation (3) should be met:

$$\text{Port } 4 = Ae^{-j0} + Ae^{-j\theta 1 - j\theta 2} = A + A*\cos(\theta 1 + \theta 2) + j*A*\sin(\theta 1 + \theta 2) = 0 \quad (3)$$

where θ1 denotes an output phase of the coupling line 421 (Port 2) corresponding to an operating frequency, θ2 denotes an output phase of the coupling line 422 (Port 3) corresponding to an operating frequency, A denotes a coupling amplitude, and j denotes mathematic symbol of complex number.

So, equation (4) may be obtained as below.

$$\theta 1 + \theta 2 = 180*(2N + 1) \quad (4)$$

where θ1 denotes an output phase of the coupling line 421 (Port 2) corresponding to an operating frequency, θ2 denotes an output phase of the coupling line 422 (Port 3) corresponding to an operating frequency and N denotes an integer.

When taking equation (4) into equation (2), output characteristics of Port 3 may be represented in equation (5):

$$\text{Port } 3 = Ae^{-j\theta 2} + Ae^{-j\theta 1} = Ae^{-j\theta 1} + Ae^{-j(180-\theta 1)} = 2A*j*\sin(\theta 1) \quad (5)$$

where θ1 denotes an output phase of the coupling line 421 (Port 2) corresponding to an operating frequency, θ2 denotes an output phase of the coupling line 422 (Port 3) corresponding to an operating frequency, A denotes a coupling amplitude, and j denotes mathematic symbol of complex number.

Figure 8A:
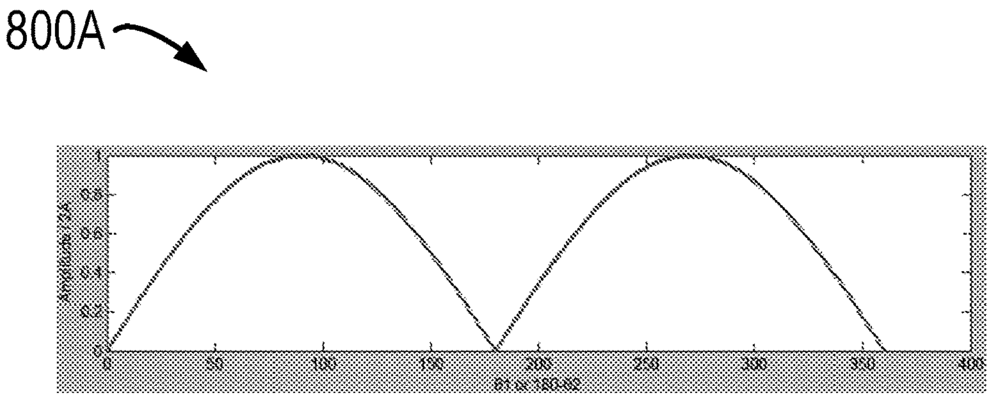
FIG. 8A illustrates a diagram of an output signal amplitude of Port 3 of a coupler according to some example embodiments of the present disclosure.

FIG. 8A illustrates a diagram 800A of an output signal amplitude of Port 3 of a coupler according to some example embodiments of the present disclosure. FIG. 8A shows a relationship between θ1 or 180−θ2 and an output normalized amplitude (output amplitude/2 A). It can be seen from FIG. 8A that the relationship exhibits a typical sine wave. No matter what value of θ1 is selected, Port 3 has a signal output.

It can be seen from equation (5) and FIG. 8A that Port 3 is a coupling port with a signal output. Especially when θ1 and θ2 meet below equation (6), Port 3 has a maximum amplitude output.

$$\theta 1 = 180 - \theta 2 = 90*(2N+1) \quad (6)$$

where θ1 denotes a phase of the coupling line 421 corresponding to an operating frequency, θ2 denotes a phase of the coupling line 422 corresponding to an operating frequency, and N denotes an integer.

It is found that equation (6) is another form of L1=L2=λ/4 when N=0 (which is the typical value used in the industry), where λ denotes a wavelength at a center frequency of an operating bandwidth of the coupler. Then it is concluded that when θ1+θ2=180*(2N+1), Port 4 acts as an isolation port with no signal output, while Port 3 acts as a coupling port. When θ1=180−θ2=90*(2N+1), Port 3 can output a maximum signal amplitude. In this way, the coupling direction has the same direction with transmitting. So, the coupler operates as a forward coupler.

To achieve a given coupling value, θ1 may be freely selected, and then θ2 may be obtained by the above equation (4). It is possible even if θ1 is not equal to θ2 and they are not 90 degrees. So far, the phases of the coupling lines 421 and 422 may be obtained. The phases may be changed into physical lengths of transmission lines based on equation (7). The distance L' between the two hole groups 431 and 432 is the same as the length of coupling line 422.

$$L' = \frac{c}{freq*\sqrt{er}} * \frac{\theta}{360} = \text{wave-length}*\theta/360 \quad (7)$$

where c denotes a speed of light in vacuum; freq denotes an operating frequency of the coupler; er denotes an equivalent dielectric constant of dielectric materials on which coupling lines 421 and 422 are formed.

If Port 3 is needed to be used as an isolation port, then the below equation (8) should be met:

$$\text{Port } 3 = Ae^{-j\theta 2} + Ae^{-j\theta 1} = 2A*\cos(\theta 2/2 - \theta 1/2)*(\cos(\theta 1/2 + \theta 2/2) + j*\sin(\theta 1/2 + \theta 2/2)) = 0 \quad (8)$$

where θ1 denotes an output phase of the coupling line 421 (Port 2) corresponding to an operating frequency, θ2 denotes an output phase of the coupling line 422 (Port 3) corresponding to an operating frequency, A denotes a coupling amplitude, and j denotes mathematic symbol of complex number.

It also means that equation (9) is met:

$$\cos(\theta 1/2 - \theta 2/2) = 0 \quad (9)$$

where θ1 denotes a phase of the coupling line 421 corresponding to an operating frequency, θ2 denotes a phase of the coupling line 422 corresponding to an operating frequency.

So, equation (10) is obtained:

$$\theta 1 - \theta 2 = 180*(2N+1) \quad (10)$$

where θ1 denotes a phase of the coupling line 421 corresponding to an operating frequency, θ2 denotes a phase of the coupling line 422 corresponding to an operating frequency, and N denotes an integer.

It can be seen from equation (10) that Port 3 has two signals with equal amplitudes and opposite phases. Thus the two signals cancel out with each other, which leading to Port 3 being an isolation port without signal output.

When taking equation (10) into equation (1), output characteristics of Port 4 is obtained by equation (11):

$$\text{Port } 4 = Ae^{-j0} + Ae^{-j\theta 1-j\theta 2} = A + A*\cos(\theta 1+\theta 2) + j*A*\sin(\theta 1+\theta 2) = A - A*\cos(2*\theta 2) - j*A*\sin(2*\theta 2) \quad (11)$$

where θ1 denotes an output phase of the coupling line 421 (Port 2) corresponding to an operating frequency, θ2 denotes an output phase of the coupling line 422 (Port 3) corresponding to an operating frequency, A denotes a coupling amplitude, and j denotes mathematic symbol of complex number.

Figure 8B:
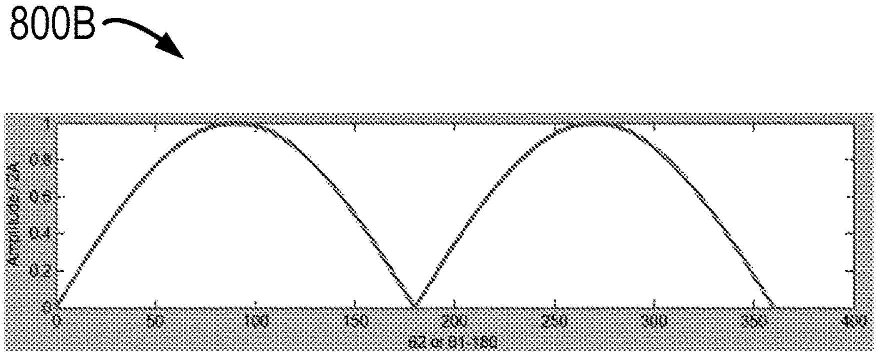
FIG. 8B illustrates a diagram of an output signal amplitude of Port 4 of a coupler according to some example embodiments of the present disclosure.

FIG. 8B illustrates a diagram 800B of an output signal amplitude of Port 4 of a coupler according to some example embodiments of the present disclosure. FIG. 8B shows a relationship between θ2 or θ1−180 and an output normalized amplitude (output amplitude/2 A). It can be seen from FIG. 8B that the relationship exhibits a typical sine wave. No matter what value of θ2 is selected, Port 4 has a signal output.

It can be seen from equation (11) and FIG. 8B that Port 4 is a coupling port with signal output. Especially when θ1 and θ2 meet below equation (12), Port 4 has a maximum amplitude output.

$$\theta 2 = \theta 1 - 180 = 90*(2N+1) \text{ or } \theta 1 + \theta 2 = 360*N \quad (12)$$

where θ1 denotes a phase of the coupling line 421 corresponding to an operating frequency, θ2 denotes a phase of the coupling line 422 corresponding to an operating frequency, and N denotes an integer.

It can be seen from the above that when θ1−θ2=180*(2N+1), Port 3 acts as an isolation port with no signal output while Port 4 acts as a coupling port. When θ2=θ1−180=90*(2N+1), Port 4 may output a maximum signal amplitude. In this way, the coupling direction has an opposite direction with transmitting. So, the coupler operates as a backward coupler.

To achieve a given coupling value by using this backward coupler, θ1 may be freely selected, and then θ2 may be obtained by equation (10). It is possible when θ1 is not equal to θ2 and they are not 90 degrees. Then physical lengths of the coupling lines 421 and 422 also may be obtained based on equation (7). A distance of the two hole groups 431 and 432 is the same as a length of the coupling line 422.

Based on above analysis, it can be seen that the output characteristics may be variable by changing the length of the coupling lines 421 and 422. When θ1+θ2=180*(2N+1), the coupler is convenient to be used as a forward coupler, where Port 4 is an isolation port and Port 3 is a coupling port. When θ1−θ2=180*(2N+1), the coupler may be used as a backward coupler, where Port 3 is an isolation port and Port 4 is a coupling port. In this case, the right length or phase may be selected to meet the actual requirements in layout.

Besides, as the two coupling lines are unnecessary to keep parallel relationship or spacing the ¼ wave-length during the whole coupling process, so the design is more flexible. Similarly, the planar size is also saved because the coupling lines exist in the vertical direction. Of course, when different θ1 and θ2 are used, output characteristics of Port 3 and Port 4 may be checked by simulation or calculation by using equations (1) and (2).

The coupling amplitude may be changed by adjusting the size of the hole groups 431 and 432, including the thickness of the substrate layer 411. The size of hole groups is bigger, the coupling amplitude will be bigger accordingly. However, if it is expected to achieve a weak coupling, but the thickness of the substrate layer 412 is thin, even the size of coupling holes is little enough, the coupling may still be bigger. Besides, a hole group with a little size is also not easy to be fabricated. Based on above analysis of coupling principle, the coupling amplitude will be decreased by keeping the port output characteristics unchanged while adjusting the length or phase of two coupling lines slightly. For example, if the forward coupler is used to achieve the coupling amplitude of A (half of total 2 A), we can select θ1=30, and θ2=150 degrees based on equation (5). By this method, the hole groups 431 and 432 may be designed with a bigger size, but a weak coupling is still obtained.

4. Example Implementation of Coupling Lines

According to embodiments of the present disclosure, the coupling lines 421 and 422 may be arranged freely into any routing shapes. In some embodiments, the coupling lines 421 and 422 may be not parallel to each other. Of course, the coupling lines 421 and 422 may also be parallel with each other. In some embodiments, the coupling lines 421 and 422 may have different lengths. Of course, the coupling lines 421 and 422 may also have the same length. In some embodiments, the coupling lines 421 and 422 may have different routing shapes. Of course, the coupling lines 421 and 422 may also have the same routing shape.

Figure 9A:
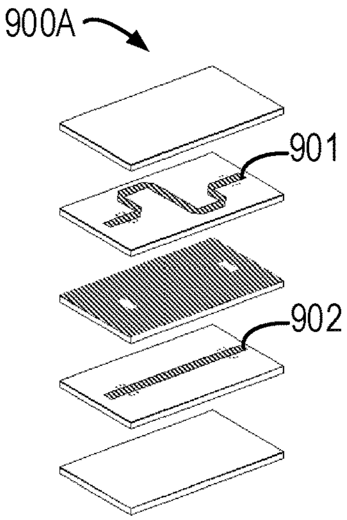
FIG. 9A illustrates a diagram of coupling lines of a coupler according to some example embodiments of the present disclosure.

FIG. 9A illustrates a diagram of coupling lines of a coupler 900A according to some example embodiments of the present disclosure. As shown in FIG. 9A, one coupling line 901 may be formed in a staggered shape, and another one coupling line 902 may be formed in a linear shape.

Figure 9B:
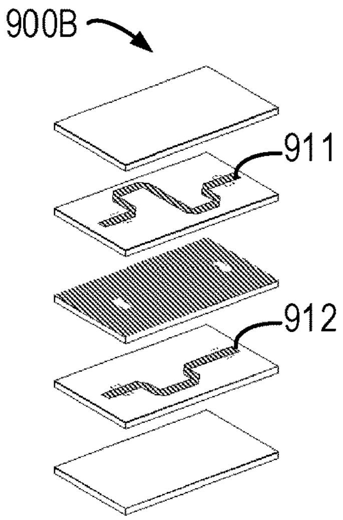
FIG. 9B illustrates another diagram of coupling lines of a coupler according to some example embodiments of the present disclosure.

FIG. 9B illustrates another diagram of coupling lines of a coupler 900B according to some example embodiments of the present disclosure. As shown in FIG. 9B, one coupling line 911 may be formed in a staggered shape, and another one coupling line 912 may be formed in a different staggered shape.

Of course, examples of FIGS. 9A and 9B are merely for illustration, and the present disclosure is not limited to these examples.

In some embodiments, the coupling lines 421 and 422 may be comprised of micro-strip lines. Of course, any other suitable forms are also feasible. In some embodiments, an equivalent impedance of each of the coupling lines 421 and 422 may be about 50 ohm. In some embodiments, the equivalent impedance may also be a value ranged from 20 ohm to 100 ohm. Of course, any other suitable values are also feasible.

5. Example Implementation of Hole Groups

According to embodiments of the present disclosure, by increasing a width (W) or length (L) of the hole groups 431 and 432 to make the hole groups bigger, the coupling may be stronger. In some embodiments, the coupling amplitude will be changed by changing the value of W compared to L.

In some embodiments, the W and L may be less than 4 times of coupling line width. In this way, only weak coupling may be obtained, for example, less than −10 dB. It's hard to achieve stronger coupling by this structure, like bigger than −10 dB. But it is better used in antenna calibration network application, which only requires −20 dB to −40 dB coupling. Of course, W and L may also be any other values or shapes, as long as the shapes of the two coupling lines needs to be modified to get a better RL. In this way, the design of the coupler is very flexible.

Figure 10:
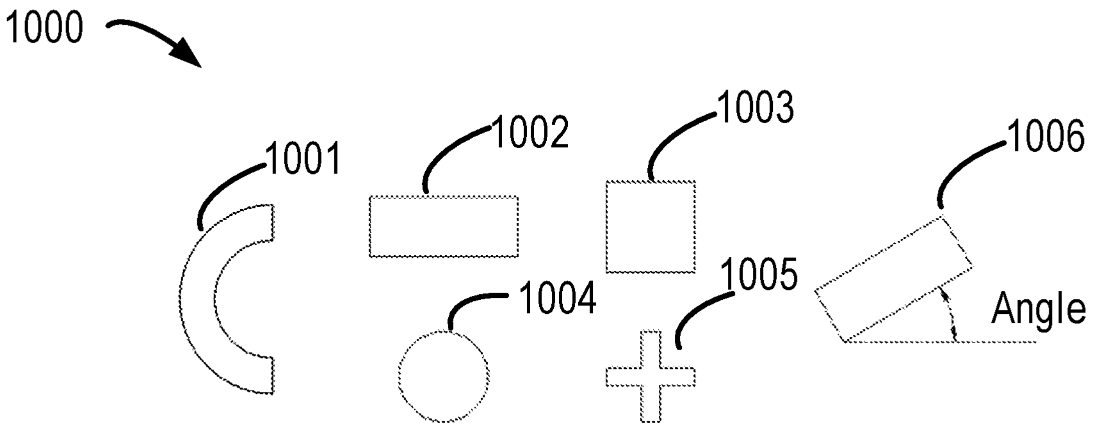
FIG. 10 illustrates a diagram of example shapes of a hole group of a coupler according to some example embodiments of the present disclosure.

According to embodiments of the present disclosure, the hole groups 431 and 432 may have any suitable shapes of holes. FIG. 10 illustrates a diagram 1000 of example hole shapes of a hole group of a coupler according to some example embodiments of the present disclosure. As shown in FIG. 10, a hole in the hole group may have an arc shape as shown by 1001. In some embodiments, a hole in the hole group may have a rectangle shape as shown by 1002. In some embodiments, a hole in the hole group may have a square shape as shown by 1003. In some embodiments, a hole in the hole group may have a circle shape as shown by 1004. In some embodiments, a hole in the hole group may have a cross shape as shown by 1005. In some embodiments, a hole in the hole group may have an angled rectangle shape as shown by 1006. Of course, any other suitable shapes are also feasible. For example, a hole in the hole group may have an angled square shape, an angled rectangle shape, an angled arc shape, an angled cross shape, and so on.

In some embodiments, each of the hole groups 431 and 432 may comprise one or more holes. In this way, a relative bandwidth of the coupler may be increased. For example, a hole group may comprise 1 to 3 holes. In this way, a proper coupling degree may be obtained.

Figure 11:
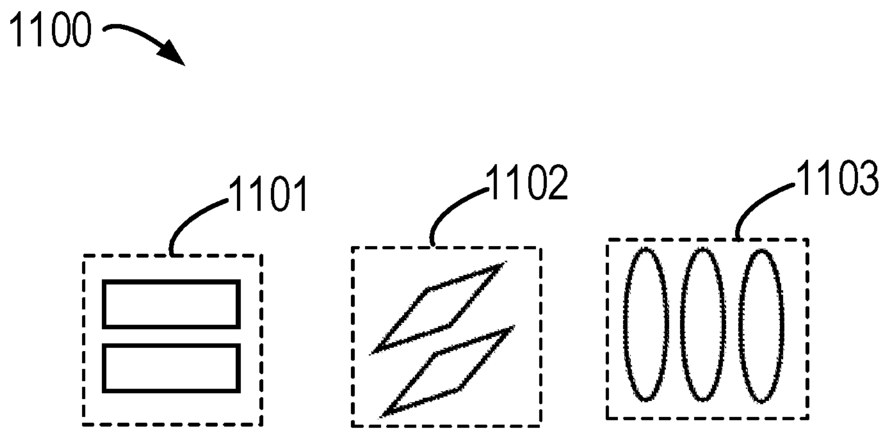
FIG. 11 illustrates a diagram of example constructions of a hole group of a coupler according to some example embodiments of the present disclosure.

The one or more holes may have any suitable shapes. FIG. 11 illustrates a diagram 1100 of example constructions of a hole group of a coupler according to some example embodiments of the present disclosure. As shown in FIG. 11, a hole group 1101 may comprise two rectangle holes. In some embodiments, a hole group 1102 may comprise two diamond holes. In some embodiments, a hole group 1103 may comprise three ellipse holes. These are merely examples, and the present disclosure does not limit this aspect.

In some embodiments, an electric length between the hole groups 431 and 432 may be within λ/8 to 3λ/8, where λ denotes a wavelength at a center frequency of an operating bandwidth of the coupler. Of course, any other suitable electric length may also be feasible.

In some embodiments, an area of a hole group in the plurality of hole groups may be within $1\%*\lambda^2$, where λ denotes a wavelength at a center frequency of an operating bandwidth of the coupler. Of course, any other suitable area values may also be feasible.

6. Example Modeling Simulation

A simulation example will be described below with reference to FIGS. 12A to 12C. To get the optimum couplings degree, electro-magnetic field simulation may be carried out. The calculation algorism is not limited. However, the size of the hole group should be mathematic described with one or two parameters. A parameter can be swept in a given range. The best results can be chosen for design.

Figure 12A:
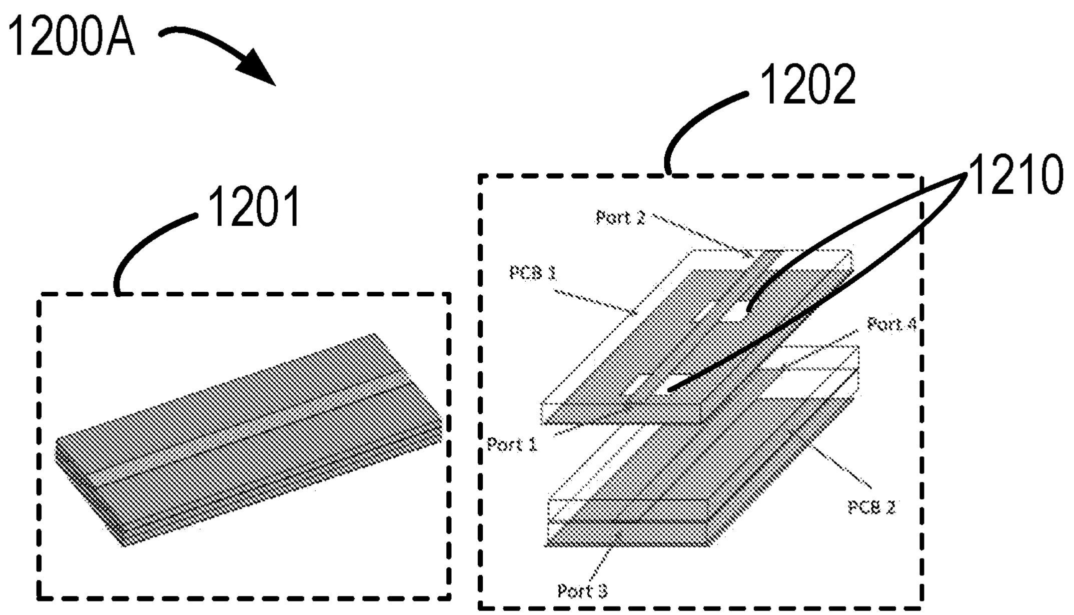
FIG. 12A illustrates an example basic simulation model for optimization of a coupler according to some example embodiments of the present disclosure.

FIG. 12A illustrates an example basic simulation model 1200A for optimization of a coupler according to some example embodiments of the present disclosure. Assuming that a size of a hole group should be optimized for a coupling degree of −19 dB by 3.6 GHz. A perspective view of a modeled coupler is as shown by 1201, and an enlarged view of the modeled coupler is as shown by 1202.

As shown in FIG. 12A, the modeled coupler comprises PCB 1 and PCB 2. The PCB 1 comprises a substrate layer, a coupling line and a ground layer. The coupling line is formed on the top surface of the substrate layer and has Port 1 and Port 2. The group layer is formed on the bottom surface of the substrate layer and is opened with two square holes 1210. The PCB 2 comprises an upper substrate layer, another coupling line formed on the bottom surface of the upper substrate layer and having Port 3 and Port 4, a lower substrate layer formed under the upper substrate layer, and another ground layer formed on the bottom surface of the lower substrate layer.

A typical thickness of PCB 1 for antenna network is 20 mil (0.5 mm) or 30 mil (0.762 mm). If the thickness is fixed, empirical formulas for network design are recommended based on simulation results as shown in Table 1. There are the following variables: the length L and width W of holes 1210; the distance d of holes 1210; and a wavelength λ at a center frequency of an operating bandwidth of the modeled coupler.

TABLE 1

An Example of Variables

| Thickness of the substrate layer in PCB 1 | L/λ | L/W | d/λ |
|---|---|---|---|
| 20 mil | 0.057 | 3/2 | 0.13 |
| 30 mil | 0.06 | 4/3 | 0.13 |

If the above mentioned variables are fixed, lengths of the two coupling lines may be calculated by the above equation 7 according design requirements.

Figure 12B:
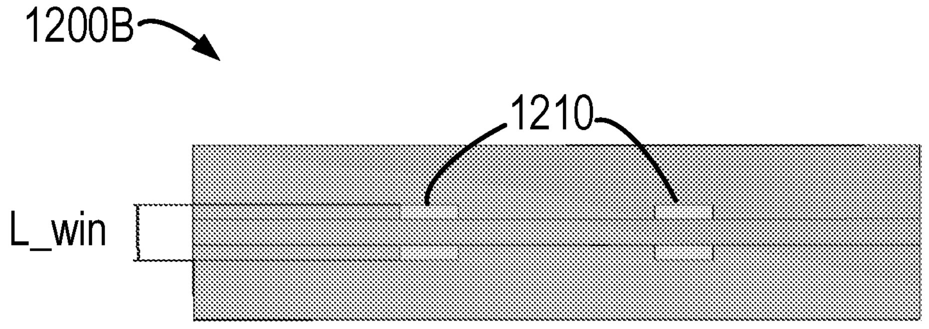
FIG. 12B illustrates a top view of the basic simulation model of FIG. 12A with a length L_win of a hole group.

FIG. 12B illustrates a top view 1200B of the basic simulation model of FIG. 12A. As shown in FIG. 12B, each of the holes 1210 has a length L_win. The L_win may influence the coupling degree. For an optimum result, the L_win should be varied in a predefined range, for example, 1.6 mm-2.4 mm.

Figure 12C:
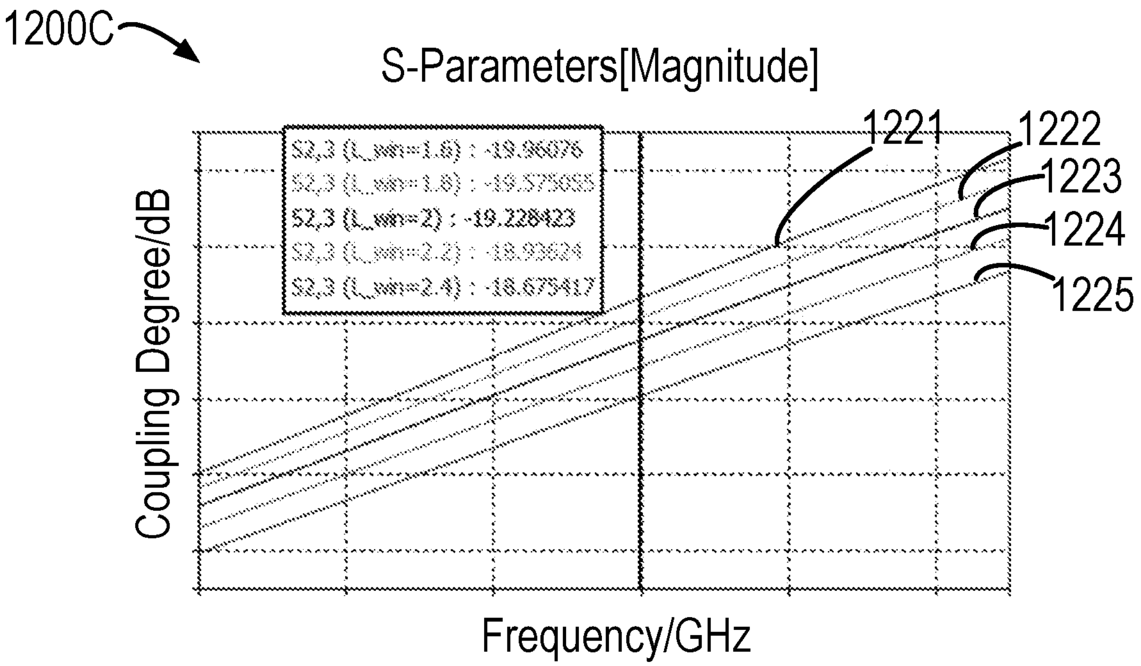
FIG. 12C illustrates a graph of a coupling degree varied with L_win according to some example embodiments of the present disclosure.

FIG. 12C illustrates a graph 1200C of a coupling degree varied with L_win according to some example embodiments of the present disclosure. As shown in FIG. 12C, a curve 1221 denotes a relationship between a couple degree and a frequency in case that L_win=2.4. In this case, the couple degree is −18.675417 dB. A curve 1222 denotes a relationship between a couple degree and a frequency in case that L_win=2.2. In this case, the couple degree is −18.93624 dB. A curve 1223 denotes a relationship between a couple degree and a frequency in case that L_win=2. In this case, the couple degree is −19.228423 dB. A curve 1224 denotes a relationship between a couple degree and a frequency in case that L_win=1.8. In this case, the couple degree is −19.575055 dB. A curve 1225 denotes a relationship between a couple degree and a frequency in case that L_win=1.6. In this case, the couple degree is −19.96076 dB.

To get the target coupling degree of −19 dB, L_win=2.2 is chosen for design. Similarly, other parameters like distance of holes can be optimized as well.

So far, a coupler according to some embodiments of the present disclosure is described. In the direction coupler, two coupling lines are formed at different layers and the coupling between the two coupling lines is achieved by a plurality of hole or hole groups in a ground layer without using a metal via. Thus, PCB space and size may be saved, RF performance may be improved, and PCB cost may be reduced.

Example Implementation of Device

Figure 13:
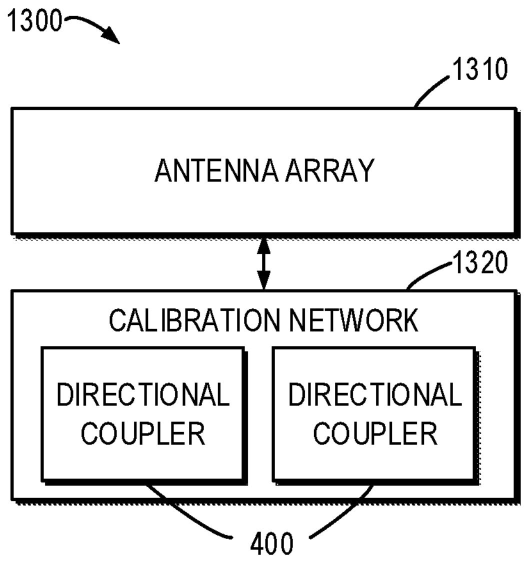
FIG. 13 illustrates a diagram of an antenna module according to some example embodiments of the present disclosure.

Correspondingly, embodiments of the present disclosure also provide an antenna module. FIG. 13 illustrates a diagram of an antenna module 1300 according to some example embodiments of the present disclosure.

As shown in FIG. 13, the antenna module 1300 comprises an antenna array 1310 and a calibration network 1320 for the antenna array 1310. The calibration network 1320 comprises a plurality of couplers 400 as described in FIGS. 4 to 12C. It is to be understood that the antenna module may also comprise any other suitable additional elements. For example, the antenna module 1300 may also comprise a feeding network (not shown) coupled between the antenna array 1310 and the calibration network 1320. The plurality of couplers 400 are configured to collect a portion of a RF signal transmitted via the feeding network for use in antenna calibration of the calibration network 1320. The present disclosure does not limit other details of the feeding network and the calibration network 1320.

Figure 14:
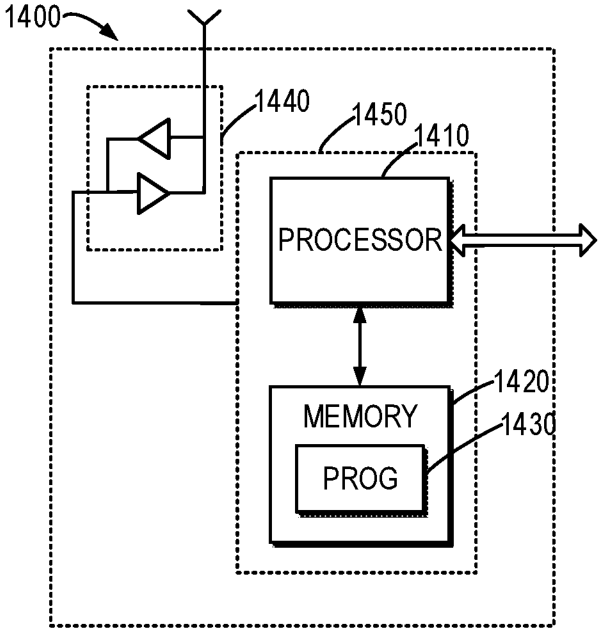
FIG. 14 illustrates a diagram of an electronic device according to some example embodiments of the present disclosure.

Embodiments of the present disclosure also provide an electronic device. The electronic device comprises a plurality of couplers as described in FIGS. 4 to 12C. The electronic device may be a communication device or a high-frequency device. FIG. 14 illustrates a diagram of an electronic device 1400 according to some example embodiments of the present disclosure. The electronic device 1400 can be implemented at or as at least a part of a network device or a terminal device.

As shown, the electronic device 1400 includes a processor 1410, a memory 1420 coupled to the processor 1410, a suitable transmitter (TX) and receiver (RX) 1440 coupled to the processor 1410, and a communication interface coupled to the TX/RX 1440. The memory 1410 stores at least a part of a program 1430. The TX/RX 1440 is for bidirectional communications. The TX/RX 1440 has an antenna module to facilitate communication, though in practice an Access Node mentioned in this application may have several ones. The at least one antenna module may comprise one or more coupler as described in FIGS. 4 to 12C.

The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1430 is assumed to include program instructions that, when executed by the associated processor 1410, enable the electronic device 1400 to operate in accordance with the embodiments of the present disclosure. The embodiments herein may be implemented by computer software executable by the processor 1410 of the electronic device 1400, or by hardware, or by a combination of software and hardware. The processor 1410 may be configured to implement various embodiments of the present disclosure. Furthermore, a combination of the processor 1410 and memory 1420 may form processing means 1450 adapted to implement various embodiments of the present disclosure.

The memory 1420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1420 is shown in the electronic device 1400, there may be several physically distinct memory modules in the device 1400. The processor 1410 may be of any type suitable to the local technical network, and may include one or more of general purpose computers, special purpose computers, microprocessors, digital signal processors (DSPs) and processors based on multicore processor architecture, as non-limiting examples. The electronic device 1400 may have multiple processors, such as an application specific integrated circuit chip that is slaved in time to a clock which synchronizes the main processor.

Example Implementation of Method

Figure 15:
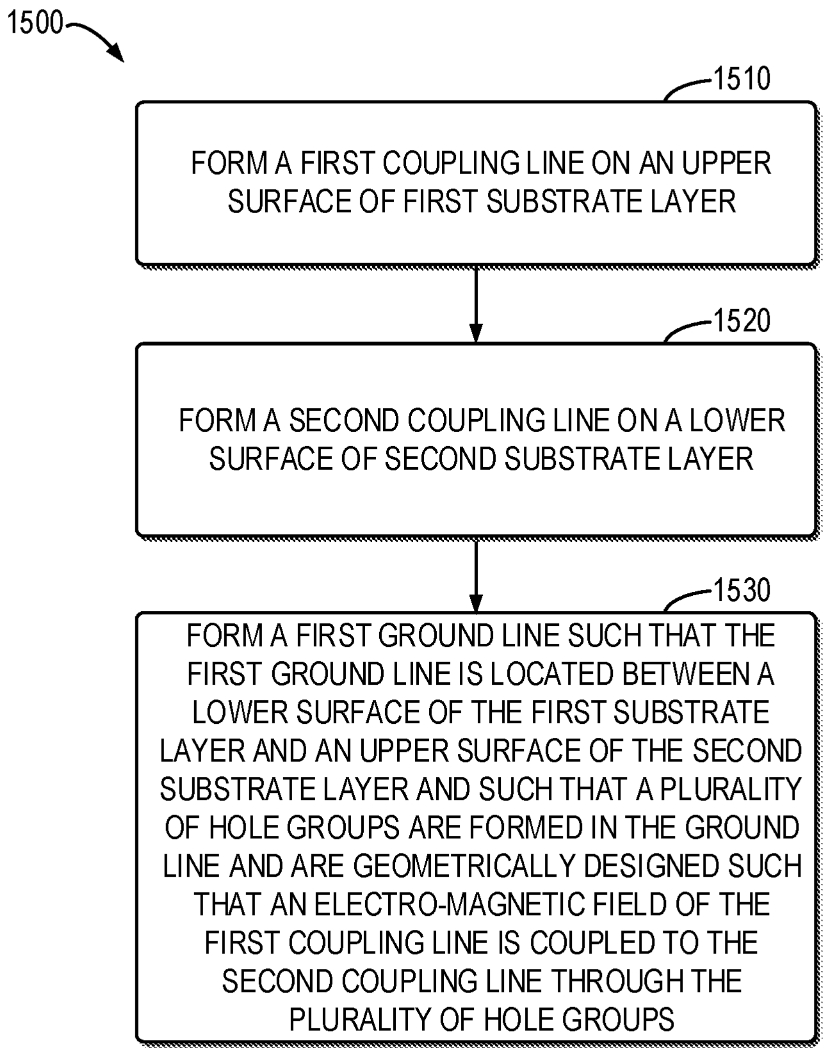
FIG. 15 illustrates a flowchart of an example method of fabricating a coupler according to some example embodiments of the present disclosure.

Correspondingly, embodiments of the present disclosure also provide a method for fabricating a coupler. FIG. 15 illustrates a flowchart of an example method 1500 for fabricating a coupler according to some example embodiments of the present disclosure. For the purpose of discussion, the method 1500 will be described with reference to FIGS. 4 to 6B. It is to be understood that the method 1500 may further include additional blocks or steps not shown and/or omit some shown blocks or steps, and the scope of the present disclosure is not limited in this regard.

As shown in FIG. 15, at block 1510, a first coupling line (for example, the coupling line 421) is formed on an upper surface of a first substrate layer (for example, the substrate layer 411). In some embodiments, the coupling line 421 may be formed by a microstrip line. Of course, any other suitable ways are also feasible. In some embodiments, the substrate layer 411 may be formed from a low-loss dielectric material which may be expensive. It is to be understood that the substrate layer 411 may be formed from any suitable dielectric materials. In some embodiments, the substrate layer 411 may be a multi-layer substrate. Of course, the substrate layer 411 may be a single-layer substrate.

At block 1520, a second coupling line (for example, the coupling line 422) is formed on a lower surface of a second substrate layer (for example, the substrate layer 412). In some embodiments, the coupling line 422 may be formed by a microstrip line. Of course, any other suitable ways are also feasible. In some embodiments, the substrate layer 412 may be formed from a different material from the substrate layer 411. Of course, the substrate layer 412 may be formed from the same material as the substrate layer 411. In some embodiments, the substrate layer 412 may be a multi-layer substrate. Of course, the substrate layer 412 may be a single-layer substrate.

At block 1530, a first ground layer (for example, the ground layer 423) is formed such that the ground layer 423 is located between a lower surface of the substrate layer 411 and an upper surface of the substrate layer 412. A plurality of hole groups (for example, hole groups 431 and 432) are formed in the ground layer 423 and are geometrically designed such that an electro-magnetic field of the coupling line 421 is coupled to the coupling line 422 through the plurality of hole groups. For example, the hole groups may be designed in lengths, widths and shapes so that the electro-magnetic field of the coupling line 421 is coupled to the coupling line 422 through the hole groups.

In some embodiments, the ground layer 423 may be formed on the lower surface of the substrate layer 411. In some embodiments, the ground layer 423 may be formed on the upper surface of the substrate layer 412.

In some embodiments, the hole group 431 or 432 may be comprised of only one hole. In some embodiments, the hole group 431 or 432 may be comprised of multiple holes. For example, the number of holes in a hole group may be between 1 and 3.

In some embodiments, the plurality of hole groups comprise two hole groups 431 and 432. In these embodiments, the coupling line 421 and the coupling line 422 may be formed such that an electric length between the two hole groups 431 and 432 is within $\lambda/8$ to $3\lambda/8$, where $\lambda$ denotes a wavelength at a center frequency of an operating bandwidth of the coupler. For example, the coupling line 421 and the coupling line 422 may be geometrically designed in lengths, widths and shapes so that the electric length between the two hole groups 431 and 432 is within $\lambda/8$ to $3\lambda/8$.

In some embodiments, a hole group in the plurality of hole groups may be formed such that an area of a hole group in the plurality of hole groups is within $1\%*\lambda^2$, where $\lambda$ denotes a wavelength at a center frequency of an operating bandwidth of the coupler. The area of the hole group may refer to a total area of one or more holes in the hole group.

In some embodiments, the coupling line 421 and the substrate layer 411 may be formed in a PCB (for example, PCB 501), and the coupling line 422 and the substrate layer 412 may be formed in another PCB (for example, PCB 502). In this case, the ground layer 423 may be formed in any one of the two PCBs. In some embodiments, the substrate layer 411 may be formed from an expensive low-loss material, and the substrate layer 412 may be formed from a cheaper material. In some embodiments, the substrate layer 412 may be formed with a size smaller than that of the substrate layer 411. In this way, PCB cost may be significantly reduced.

In some embodiments, the coupling line 421, the substrate layer 411, the ground layer 423, the substrate layer 412 and the coupling line 422 may be formed in a multi-layer PCB. In these embodiments, the substrate layer 411 and the substrate layer 412 may be formed from the same material and may be formed with the same size.

In some embodiments, a third substrate layer (for example, the substrate layer 613) may be further formed on the substrate layer 411, and a second ground layer (for example, the ground layer 624) may be further formed on the substrate layer 613. In this way, the coupling line 421 may be well isolated.

In some embodiments, a fourth substrate layer (for example, the substrate layer 614) may be further formed on a lower surface of the substrate layer 412 to cover the coupling line 422, and a third ground layer (for example, the ground layer 625) may be further formed on a lower surface of the substrate layer 614. In this way, the coupling line 422 may also be well isolated.

It is to be understood that the formation of the above layers or lines may be implemented by any suitable semiconductor processes, and the present disclosure does not limit this aspect.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

As an example, the embodiments of the present disclosure can be described in the context of the machine executable instruction which is included, for example, in a program module executed in a device on a target physical or virtual processor. Generally, the program module includes a routine, program, library, object, class, component, data structure and the like, which executes a particular task or implement a particular abstract data structure. In various embodiments, the functions of the program modules can be merged or split among the program modules described herein. A machine executable instruction for a program module can be executed locally or within a distributed device. In a distributed device, a program module can be located in both of a local and a remote storage medium.

Program code for carrying out methods of the present disclosure may be written in any combination of one or more programming languages. The program code may be provided to a processor of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, computer program code or related data can be carried by any appropriate carrier, such as an apparatus, device or processor can execute various processing and operations as described above. The example of the carrier includes a signal, a computer readable medium and the like. The example of the signal may include a signal broadcast electrically, optically, wirelessly, acoustically or in other forms, such as a carrier, an infrared signal and the like.

A computer readable medium may be any tangible medium that may contain, or store a program for use by or in connection with an instruction execution system, apparatus or device. The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations of the present methods are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It would be appreciated that features and functions of two or more devices according to the present disclosure can be implemented in combination in a single implementation. Conversely, various features and functions that are described in the context of a single implementation may also be implemented in multiple devices.

Although the present disclosure has been described with reference to various embodiments, it should be understood that the present disclosure is not limited to the disclosed example embodiments. The present disclosure is intended to cover various modifications and equivalent arrangements included in the spirit and scope of the appended claims.

What is claimed is:

1. A coupler, comprising:

a first substrate layer;

a second substrate layer located below the first substrate layer;

a first coupling line located on an upper surface of the first substrate layer;

a second coupling line located on a lower surface of the second substrate layer; and a first ground layer located between a lower surface of the first substrate layer and an upper surface of the second substrate layer, a plurality of hole groups being formed in the first ground layer and being geometrically designed such that an electro-magnetic field of the first coupling line is coupled to the second coupling line through the plurality of hole groups, wherein the first coupling line and the first substrate layer are located in a first printed circuit board, and the second coupling line and the second substrate layer are located in a second printed circuit board different from the first printed circuit board.

2. The coupler of claim 1, wherein the first ground layer is formed on a lower surface of the first substrate layer.

3. The coupler of claim 1, wherein the first ground layer is formed on an upper surface of the second substrate layer.

4. The coupler of claim 1, wherein the first coupling line, the first substrate layer, the first ground layer, the second substrate layer and the second coupling line are located in a multi-layer printed circuit board.

5. The coupler of claim 1, wherein a hole group in the plurality of hole groups comprises one or more holes.

6. The coupler of claim 1, wherein the plurality of hole groups comprise two hole groups and an electric length between the two hole groups is within λ/8 to 3λ/8, where λ denotes a wavelength at a center frequency of an operating bandwidth of the coupler.

7. The coupler of claim 1, wherein an area of a hole group in the plurality of hole groups is within $1\%*\lambda^2$, where λ denotes a wavelength at a center frequency of an operating bandwidth of the coupler.

8. The coupler of claim 1, further comprising:

a third substrate layer located on the first substrate layer; and a second ground layer located on the third substrate layer.

9. The coupler of claim 8, further comprising:

a fourth substrate layer located below the second substrate layer; and a third ground layer located below the fourth substrate layer.

10. An antenna module comprising:

an antenna array; and a calibration network for the antenna array, the calibration network comprising a plurality of couplers, wherein each coupler comprises:

a first substrate layer;

a second substrate layer located below the first substrate layer;

a first coupling line located on an upper surface of the first substrate layer;

a second coupling line located on a lower surface of the second substrate layer; and a first ground layer located between a lower surface of the first substrate layer and an upper surface of the second substrate layer, a plurality of hole groups being formed in the first ground layer and being geometrically designed such that an electro-magnetic field of the first coupling line is coupled to the second coupling line through the plurality of hole groups.

11. An electronic device comprising an antenna module of claim 10.

12. An electronic device comprising a coupler of claim 1.

13. A method for fabricating a coupler, comprising:

forming a first coupling line on an upper surface of a first substrate layer;

forming a second coupling line on a lower surface of a second substrate layer, the second substrate layer being located below the first substrate layer; and forming a first ground layer such that the first ground layer is located between a lower surface of the first substrate layer and an upper surface of the second substrate layer, and such that a plurality of hole groups are formed in the first ground layer and are geometrically designed such that an electro-magnetic field of the first coupling line is coupled to the second coupling line through the plurality of hole groups, wherein the first coupling line and the first substrate layer are formed in a first printed circuit board, and the second coupling line and the second substrate layer are formed in a second printed circuit board different from the first printed circuit board.

14. The method of claim 13, wherein forming the first ground layer comprises:

forming the first ground layer on the lower surface of the first substrate layer.

15. The method of claim 13, wherein forming the first ground layer comprises:

forming the first ground layer on the upper surface of the second substrate layer.

16. The method of claim 13, wherein the first coupling line, the first substrate layer, the first ground layer, the second substrate layer and the second coupling line are formed in a multi-layer printed circuit board.

17. The method of claim 13, wherein a hole group in the plurality of hole groups is comprised of one or more holes.

18. The method of claim 13, wherein the plurality of hole groups comprise two hole groups, and wherein the first coupling line and the second coupling line are formed such that an electric length between the two hole groups is within λ/8 to 3λ/8, where λ denotes a wavelength at a center frequency of an operating bandwidth of the coupler.

19. The method of claim 13, wherein a hole group in the plurality of hole groups is formed such that an area of a hole group in the plurality of hole groups is within $1\%*\lambda^2$, where λ denotes a wavelength at a center frequency of an operating bandwidth of the coupler.

20. The method of claim 13, further comprising:

forming a third substrate layer on the first substrate layer; and forming a second ground layer on the third substrate layer.

21. The method of claim 20, further comprising:

forming a fourth substrate layer below the second substrate layer; and forming a third ground layer below the fourth substrate layer.

* * * * *